(12) United States Patent
Stumpf et al.

(10) Patent No.: US 9,020,973 B2
(45) Date of Patent: Apr. 28, 2015

(54) USER INTERFACE MODEL DRIVEN DATA ACCESS CONTROL

(75) Inventors: Dirk Stumpf, Graben-Neudorf (DE); Tim Kornmann, Wiesloch (DE); Gerd Ritter, Heidelberg (DE); Rene Gross, Heidelberg (DE); Cristina Buchholz, Reilingen (DE); Lambert Boskamp, Dossenheim (DE)

(73) Assignee: SAP SE, Walldorf, DE (US)

( * ) Notice: Subject to any disclaimer, the term of this patent is extended or adjusted under 35 U.S.C. 154(b) by 385 days.

(21) Appl. No.: 13/338,066

(22) Filed: Dec. 27, 2011

(65) Prior Publication Data

US 2013/0166596 A1 Jun. 27, 2013

(51) Int. Cl.
*G06F 17/30* (2006.01)
*H04L 29/06* (2006.01)

(52) U.S. Cl.
CPC ...... *H04L 63/102* (2013.01); *G06F 2221/2145* (2013.01)

(58) Field of Classification Search
None
See application file for complete search history.

(56) References Cited

U.S. PATENT DOCUMENTS

| | | | |
|---|---|---|---|
| 6,757,680 B1 * | 6/2004 | Choy | 1/1 |
| 6,918,044 B1 * | 7/2005 | Robins et al. | 726/5 |
| 7,350,229 B1 * | 3/2008 | Lander | 726/8 |
| 7,797,534 B2 * | 9/2010 | Rits | 713/156 |
| 8,140,576 B1 * | 3/2012 | Viripaeff et al. | 707/781 |
| 8,453,127 B2 * | 5/2013 | Balko et al. | 717/144 |
| 8,555,378 B2 * | 10/2013 | Bowman et al. | 726/21 |
| 2007/0056025 A1 * | 3/2007 | Sachdeva et al. | 726/5 |
| 2007/0261107 A1 * | 11/2007 | Ng et al. | 726/5 |
| 2008/0016554 A1 * | 1/2008 | Rits | 726/4 |
| 2008/0263643 A1 * | 10/2008 | Jaiswal et al. | 726/6 |
| 2010/0132053 A1 * | 5/2010 | Chishima | 726/30 |
| 2010/0269156 A1 * | 10/2010 | Hohlfeld et al. | 726/4 |
| 2010/0319067 A1 * | 12/2010 | Mohanty et al. | 726/21 |
| 2011/0167433 A1 * | 7/2011 | Appelbaum et al. | 719/318 |
| 2011/0314261 A1 * | 12/2011 | Brucker et al. | 712/207 |
| 2012/0167200 A1 * | 6/2012 | Buchholz et al. | 726/17 |
| 2013/0117699 A1 * | 5/2013 | Branson et al. | 715/769 |

\* cited by examiner

*Primary Examiner* — Richard Bowen
(74) *Attorney, Agent, or Firm* — Brake Hughes Bellermann LLP

(57) ABSTRACT

According to one general aspect, a method of retrieving data entities from a backend data device may include maintaining a data model of data entities employed by a user interface. The data model may include a hierarchical relationship between a leading data entity and at least one child data entity. The method may also include authorizing, with an authorization device, when retrieving the leading data entity. The method may include instructing the authorization device that data retrievals of subsequent data entities are to be authorized based upon the authorization of the leading data entity. The method may also include retrieving at least one child data entity of the leading data entity without providing additional authorization credentials.

17 Claims, 6 Drawing Sheets

FIG. 4 400

Personalize  Adapt  Help  Process  Theming

Sales Order: 1046 ⟵ 402

⊖ Status: In Preparation  Account: Approximal Inc.  External Reference:  Employee Responsible: Heather Smith  Net Value w/o Freight:  Total:

[Sumit ▲] [Save] [Close] | [Preview] [New ▲] [Copy] [New ▲] [Follow-Up ▲]

Account
Name:*       [Approximal Inc.] [New ▲]           Contact
Address      216 Addison Street                  Name:       [Approximal Inc.] [New]
             Dallas TX 75001  ⟵ 404              Phone:
             United States                       E-Mail:

Show Ship-To/Bill-To: ☐

Ship-To                                          Bill-To
Name:        [Approximal Inc.] [New ▲]           Name:       [Approximal Inc.] [New ▲]
Address:     216 Addison Street  ⟵ 406           Address:
             Dallas TX 75001
             United States General                                          Organizational Assignment
Status:      [In Preparation]                    Employee Responsible: [Heather Smith]
Description:                                     Sales Unit:            [Sales]
External Reference:                              Sales Organization:    Sales
Posting Date:    [26.10.2010]                    Distribution Channel:  [Direct sales]
Requested Date:  [28.10.2010]
Name of field2:  [9.00] [EUR]                    Payment
                                                 Payment Terms:         [                    ]
Delivery
Delivery Priority: [Normal]

Items
[Add Row] [Remove] | [Check availability] [Release Execution] [Complete Execution] [Price History] [Fast Entry]

| Line | ATP | Product ID | | | Quantity | List Price | Discount (%) |

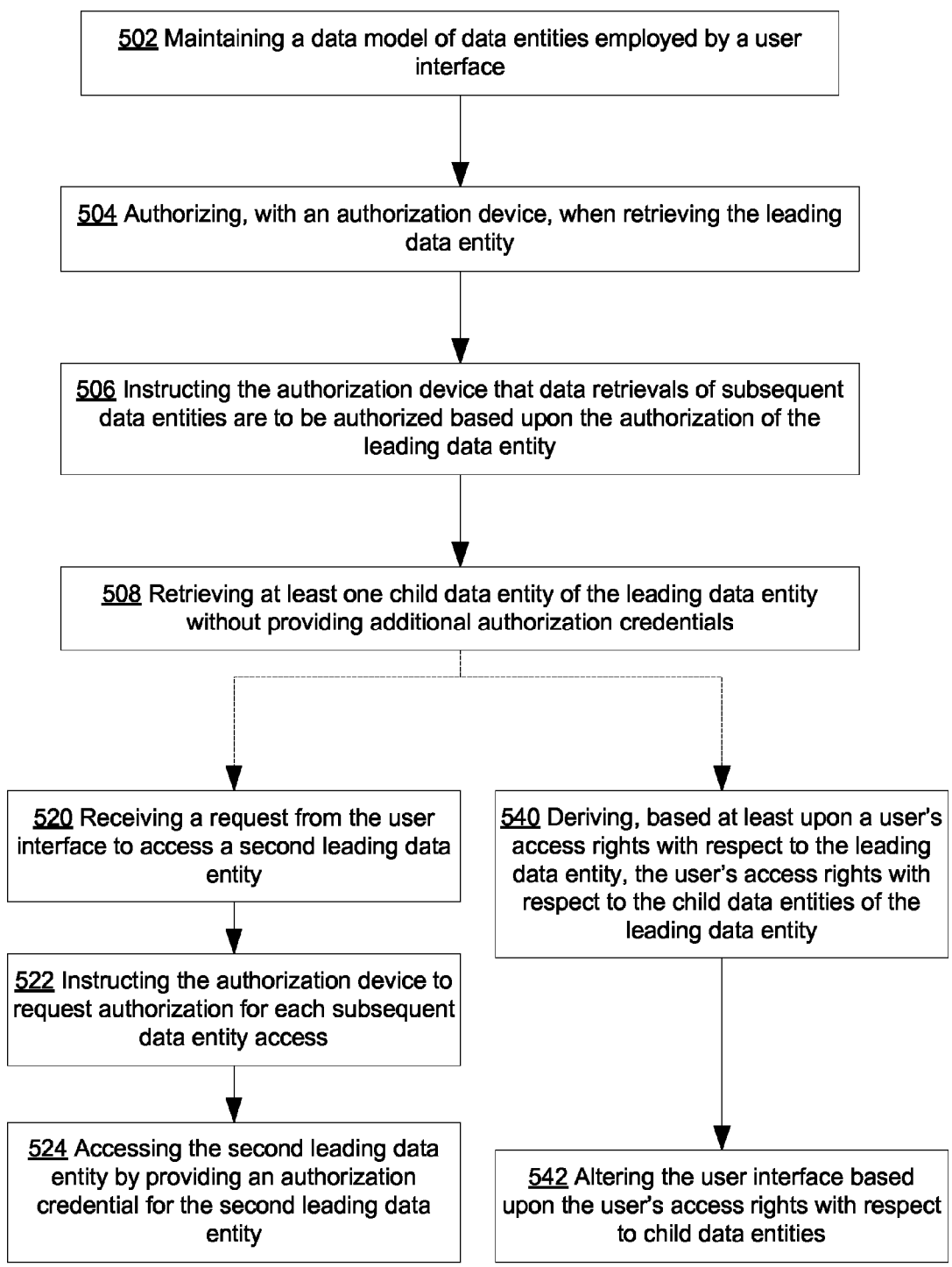

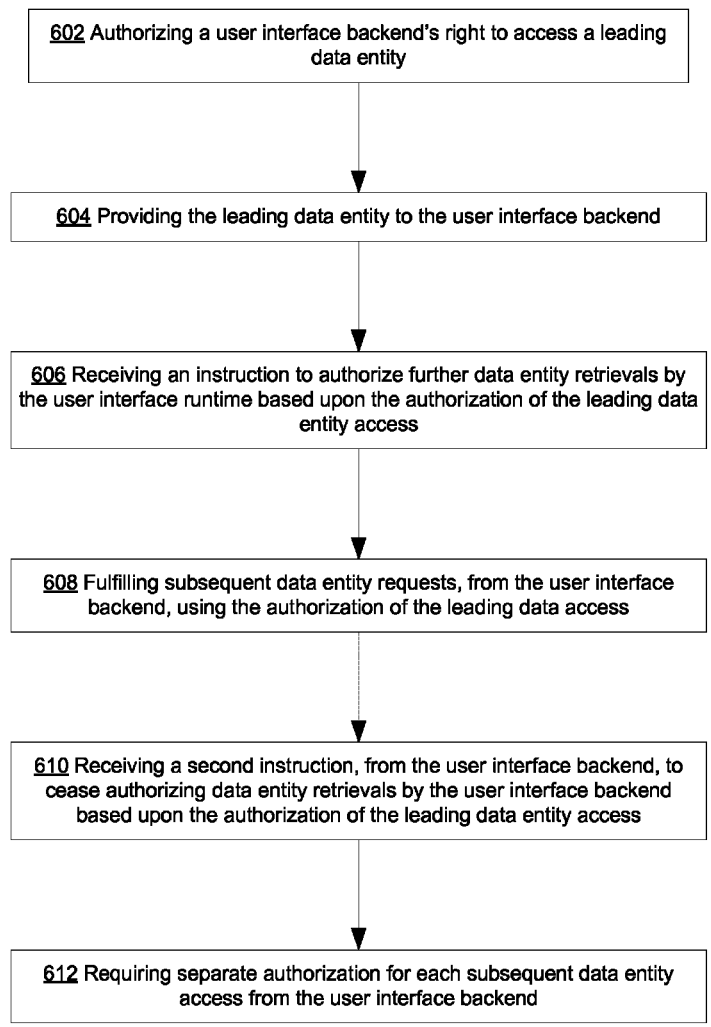

USER INTERFACE MODEL DRIVEN DATA ACCESS CONTROL

TECHNICAL FIELD

This description relates to processing and dissemination of information, and more specifically to managing the authorization to access information.

BACKGROUND

Today's Access Management solutions generally have a service centric view. This means that the primary goal is typically to protect data and services on the backend service or provisioning layer. This generally makes sure that access checks are always performed on the granularity of the services offered regardless of the consumer that is requesting these services. Also, this often makes it difficult to do user interface (UI) specific optimizations for UIs that cross service boundaries (e.g., from one data provider to another, etc.). For example, typically for each service request a UI makes to a backend server, one or many authorization or security checks must be made within the service execution layer.

Often for every data access service (e.g., a read or a write, etc.) a requesting device or UI must provide appropriate authorization or credentials to access the desired data. On service provisioning side (also known as backend side) these UI centric service requests are translated into data centric service requests. This UI model translation and the belonging data service calls are performed by the backend UI framework. Typically one UI service call is disassembled into multiple core data service calls. The different results of these multiple core service calls is then assembled into the UI response and sent back to client side. Today for each of these core service calls the core service layer will perform a separate access control not knowing the relationship between all these calls. This may cause a bad response time and a large amount of overhead for processing the access control for each core service call separately although they potentially perform semantically redundant checks (e.g. checking parent AND child data even though both are displayed together in the same row of a table).

SUMMARY

According to one general aspect, a method of retrieving data entities from a backend data device may include maintaining a data model of data entities employed by a user interface. The data model may include a hierarchical relationship between a leading data entity and at least one child data entity. The method may also include authorizing, with an authorization device, when retrieving the leading data entity. The method may include instructing the authorization device that data retrievals of subsequent data entities are to be authorized based upon the authorization of the leading data entity. The method may also include retrieving at least one child data entity of the leading data entity without providing additional authorization credentials.

According to another general aspect, an apparatus may include a processor and a network interface. The processor may be configured to maintain a data model of data entities employed by a user interface, wherein the data model includes a hierarchical relationship between a leading data entity and at least one child data entity. The network interface configured to authorize, with an authorization device, when retrieving the leading data entity, instruct the authorization device that data retrievals of subsequent data entities are to be authorized based upon the authorization of the leading data entity, and retrieve at least one child data entity of the leading data entity without providing additional authorization credentials.

According to another general aspect, a method may include authorizing, by an authorization device, a user interface backend's right to access a leading data entity. The method may include providing the leading data entity to the user interface backend. The method may also include receiving an instruction, from the user interface backend, to authorize further data entity retrievals by the user interface runtime based upon the authorization of the leading data entity access. The method may further include fulfilling subsequent data entity requests, from the user interface backend, using the authorization of the leading data access.

The details of one or more implementations are set forth in the accompanying drawings and the description below. Other features will be apparent from the description and drawings, and from the claims.

A system and/or method for accessing information, substantially as shown in and/or described in connection with at least one of the figures, as set forth more completely in the claims.

BRIEF DESCRIPTION OF THE DRAWINGS

FIG. 4 is a screenshot of an example embodiment of a user interface in accordance with the disclosed subject matter.

FIG. 5 is a flowchart of an example embodiment of a technique in accordance with the disclosed subject matter.

FIG. 6 is a flowchart of an example embodiment of a technique in accordance with the disclosed subject matter.

Like reference symbols in the various drawings indicate like elements.

DETAILED DESCRIPTION

Figure 1:
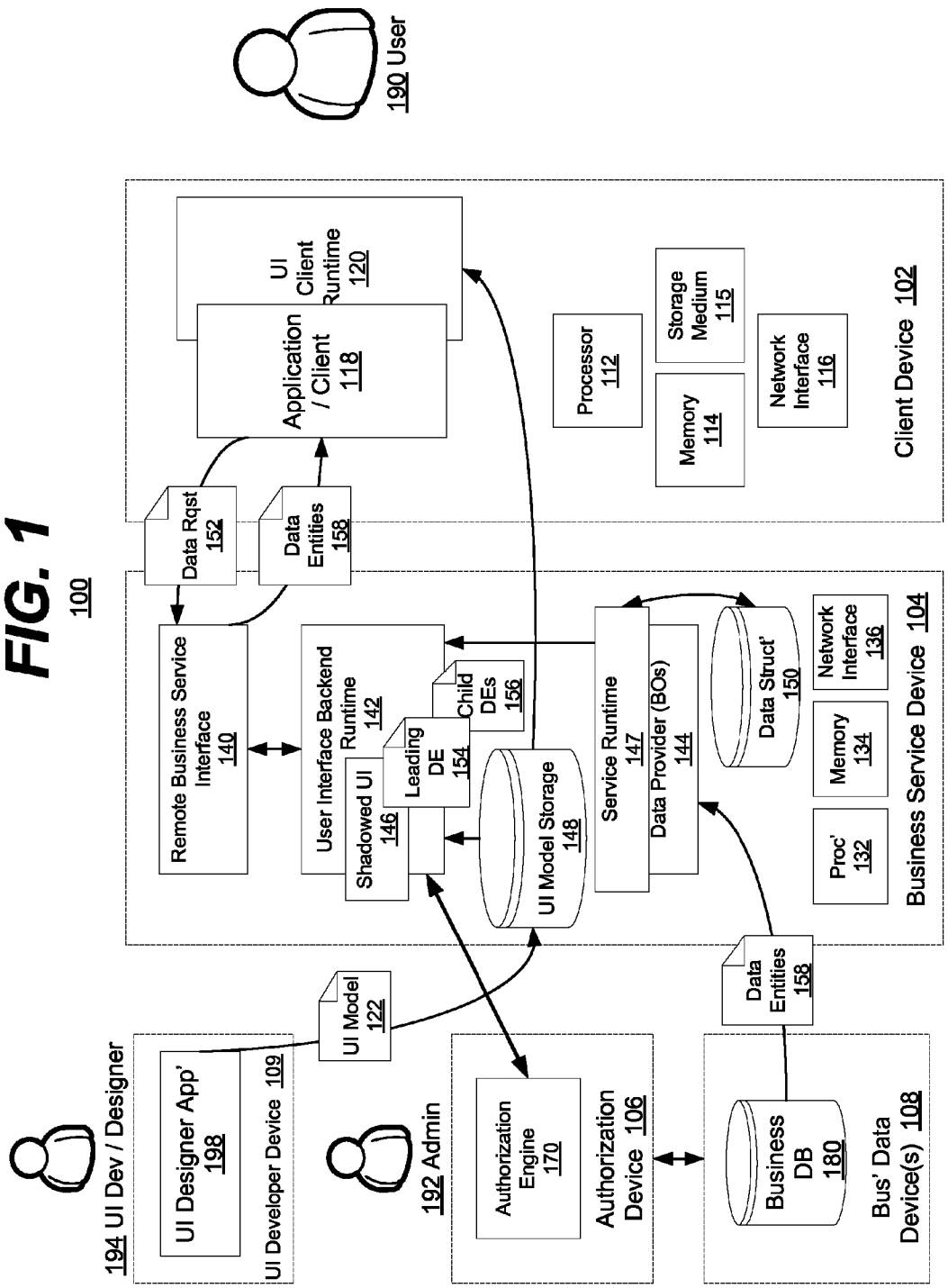
FIG. 1 is a block diagram of an example embodiment of a system in accordance with the disclosed subject matter.

FIG. 1 is a block diagram of an example embodiment of a system 100 in accordance with the disclosed subject matter. The system 100 shows one rather generic embodiment of the disclosed subject matter. Another more specific embodiment of the disclosed subject matter is show in FIG. 2 and described in more detail below. It is understood that the above are merely a few illustrative examples to which the disclosed subject matter is not limited.

In the illustrated embodiment, the system 100 may include a client computing device 102 that is used by a user 190. This client device 102 may access a business service or a business service device 104 via a communications network. This business service device 104 may provide the backend or server portion of an application, often for use in a business, such as, for example, Supplier Relationship Management (SRM), Product Lifecycle Management (PLM), Supply Chain Management (SCM), Customer relationship management (CRM), Enterprise resource planning (ERP), etc. It is understood that the above are merely a few illustrative examples to which the disclosed subject matter is not limited.

In various embodiments, the client device 102 and other devices illustrated (e.g., devices 104, 106, 108, etc.) may include a computing device, such as, for example, a shared computing terminal, a thin client, a desktop personal computer, a laptop, a netbook, a tablet, a smartphone, etc. or a virtual machine thereof. In various embodiments, the client device 102 may be used by a user 190. In various embodiments, the computing device 102 may include a processor 112 configured to execute one or more machine executable instructions or pieces of software, firmware, or a combination thereof. The computing device 102 may include, in some embodiments, a memory 114 configured to store one or more pieces of data, either temporarily, permanently, semi-permanently, or a combination thereof. Further, the memory 114 may include volatile memory, non-volatile memory or a combination thereof. In various embodiments, the computing device 102 may include a storage medium 115 configured to store data in a semi-permanent or substantially permanent form. In various embodiments, the storage medium 115 may be included by the memory 114. In some embodiments, the computing device 102 may include one or more network interfaces 116 configured to associate with and communicate via one or more communication networks (e.g., a wired network, a wireless network, a cellular network, etc.). In various embodiments, the computing device 102 may include one or more other hardware components (not shown) (e.g., a display or monitor, a keyboard, a touchscreen, a camera, a fingerprint reader, a video processor, etc.).

In various embodiments, the computing device 102 may include an operating system (OS) (not shown) configured to provide one or more services to an application 118 and manage or act as an intermediary between the applications 118 and the various hardware components (e.g., the processor 112, the network interface 116, etc.) of the computing device 102. In such an embodiment, the computing device 102 may include one or more applications 118, which may be installed locally (e.g., within the storage medium 115, etc.) and configured to be executed directly by the processor 112 and directly interact with the OS. In such an embodiment, the applications 118 may include pre-compiled machine executable code. In some embodiments, the applications 118 may include a script interpreter (e.g., JavaScript, C shell (csh), AppleScript, AutoHotkey, etc.) or a virtual machine (e.g., the Java Virtual Machine, the Microsoft Common Language Runtime, etc.) that are configured to translate source or object code into executable code which is then executed by the processor 112.

In some embodiments, the application 118 may include a web browser configured to access a web site or a collection of web pages, scripts, etc. from a physically remote server or web server (e.g., business service device 104, etc.). In another embodiment, the application 118 may include a specially built program designed to interact with the business service or backend portion of the application. It is understood that the above is merely one illustrative example to which the disclosed subject matter is not limited.

In various embodiments, the system 100 may include a business service device 104. In some embodiments, the business service device 104 may include a processor 132, memory 134, and network interface 136, that are analogous to the processor 112, memory 114 (with or without the storage medium 115), and network interface 116, as described above.

In the illustrated embodiment, the business service device 104 may include a backend service or remote business service interface 140 configured to receive requests from the client application 118 and provide responses (e.g., data entities 158, etc.) to such requests. In some embodiments, the backend service or remote business service interface 140 may also initiate communications (e.g., various requests, etc.) with the client application 118, such that the communication may be bi-directionally initiated. It is understood that the above are merely a few illustrative examples to which the disclosed subject matter is not limited.

In one embodiment, the business service may include one or more machine executable instructions. In another embodiment, the business service may be embodied in a hardware device or circuit or other logic device. In various embodiments, during the runtime or execution of the business service by the processor 132 (or by itself in embodiments in which the business service includes hardware elements), the business service may create various data structures (e.g., objects, variables, etc.). In various embodiments, these data structures may be temporary and exist only during the runtime of the business service. In one embodiment, some of these data structures may have permanent counterparts (e.g., classes, etc.) included by the business service or the corresponding runtime. In some embodiments, these temporary data structures may be stored within the memory 134. In various embodiments, the business service device 104 may include a remote business service interface 140. In such an embodiment, the remote business service interface 140 may be configured to compile or translate the client requests (e.g., data request 152, etc.) into something the service provisioning layer (UI Backend Runtime 142, Service Runtime 147, Data Provider 144, etc.) can execute or comprehend (e.g., filtering on a table is translated into a search service, etc.). It is understood that the above is merely one illustrative example to which the disclosed subject matter is not limited.

In one embodiment, the business service device 104 may include, at least during runtime, a service data structure or database 150. In various embodiments, this data structure 150 may include one or more data entities or fields. These data entities may also be referred to as "business objects (BOs)" (e.g., "SalesOrder", "BusinessPartner", "Product" etc.) and may include smaller substructures, data fields, or values and or by other terms (e.g., a database entry or row). In various embodiments, these Data Providers 144 (e.g., BOs, etc.) may implement a predefined interface that allows data to be read/write from/to them and to execute actions on them. In various embodiments, the layer which calls this predefined interface may be referred to as the Service Runtime 147. In various embodiments, they may deliver BO specific data structures which are assembled by the UI runtime 142 into the UI data structures 150. In some embodiments, the data structure 150 may be organized into, for example, a relational database, a data tree, a series of nodes, a table with columns and rows, etc. In such an embodiment, a data field on the UI may include a field, node, or cell of such a data structure. A data field may include or be associated with a data field value, a data type (e.g., integer, Boolean, string, etc.), and other attributes.

In various embodiments, a portion of the service data structure or database 150 may be populated by data entities 158 from one or more business databases 180. These business databases 180 may be hosted on one or more business data devices 106. In some embodiments, these business databases 180 have been created or maintained by other business services (not shown). For example, a CRM service (business service 140) may draw data from a business database 180 created by a SCM service (not shown). In one embodiment, the services that read and write data to the database 180 are the Data Providers 144 and these Data Providers 144 may provide the so-called Core Services but not on a UI level. It is understood that the above is merely one illustrative example to which the disclosed subject matter is not limited. In some embodiments, the business data device 106 and the business service device 104 may be the same device. In yet another embodiment, the two devices may be separate, geographically or in a network topology sense, or run by separate businesses or entities.

In one embodiment, the application or client 118 (e.g., a web application, such as a Microsoft Silverlight program, executed within or by a web browser, etc.) may include a user interface (UI) client runtime 120 configured to allow a user 190 to interact with the application 118 and view, edit, or delete various pieces of data (e.g., data entities 158, etc.). This UI client runtime may include or be associated with a UI Model 122 that defines, at least in part, the UI client runtime and more specifically how the UI client runtime has organized to chosen to display (e.g., via UI elements, screens, tabs, etc.) data entities 158. In such an embodiment, the UI client runtime may be based upon the Model-View-Controller (MVC) software architecture in which the software logic is essentially separated into three overall functions.

In a preferred embodiment, the UI Model 122 may be the only thing which defines the Application 118. In one embodiment, the UI Model 122 may define the data (e.g., fields, structures, and lists, etc.) used by the application 118 and how they are bound to the service provider data, responds to requests for information about its state (usually from the controller), and responds to instructions to change state (usually from the controller). Specifically, in various embodiments, the UI client 120 (which may be defined by the UI model 122) may ask the Data Providers (BOs) 144 about their status (via the service runtime 147) and the UI client 120 may trigger change state requests towards the BOs. In such an embodiment, the UI 120 may be based upon the Model-View-Controller (MVC) software architecture in which the software logic is essentially separated into three overall functions.

In a preferred embodiment, the "model" in the MVC sense may be entirely on backend side (e.g., UI Backend Runtime 142, etc.) and it is defined in the Metadata Repository Systems (MDRS), as described below. It may not know anything about the controller and the view on top of it. In addition one may have the UI Model 122. In such an embodiment, the UI Model 122 may describe metadata-wise the view and the controller behavior. In some embodiments, the UI Model 122 may be stored within a UI Model Storage 148.

For instance, the UI Model 122 may define where the UI buttons are and what happens if they are clicked, which services are called by them and which UI tables are bound to the response data delivered by the services. In one specific example embodiment, in the UI Model 122 there may be a table describing in terms of layout, text formatting, column headers, grouping, sorting, and many other UI options. In addition the UI model 122 may describe what data are supposed to be shown in that table, (e.g. BO=SalesOrder, Node=SalesOrderItems, Fields=ID, deliveryDate, address, etc.). Whenever such a data set arrives at the client 102, the portion of the controller logic that resides within the UI client runtime makes sure that the right table is notified and that the data are shown there.

In event-driven MVC systems, the model often notifies observers (usually views) when the information changes so that they can react. The "view" (e.g., UI client runtime) renders the model into a form suitable for interaction, typically a user interface element. Multiple views can exist for a single model for different purposes. And, the "controller" (e.g., remote business service interface 140, UI backend runtime 142, etc.) receives user input and initiates a response by making calls on model objects. A controller accepts input from the user and instructs the model and viewport to perform actions based on that input. It is understood that the above is merely one illustrative example to which the disclosed subject matter is not limited.

This UI Model 122 may have been created, edited or designed by an Administrator 192 or UI designer 194. The UI designer 194 may have edited or designed the UI Model (and other aspects of the UI client runtime) via a UI Designer Application 198 executed by an Administrative Device 109. In various embodiments, the Administrative Device 109 may be similar or analogous to the client device 102.

In such an embodiment, the UI Model 122 may define how data is grouped and organized within the UI client runtime. For example, the UI client runtime may allow a user 190 to view a Sales Order. This Sales Order may be associated with or include a certain data entity 158. Further, the Sales Order data entity may also include or be linked with various Items that are being bought as part of the Sales Order. These Items may, in turn, be their own data entities. Also, the Sales Order may be associated with or include other data entities such as, for example, a Customer data entity, an Accounting data entity, a Salesman data entity, etc. The UI client runtime may display all of these data entities in the same screen or tab or more generally UI container or may display these data entities via related screens, tabs, or other UI elements. The UI Model 122 may contain the relationship between these various entities.

Traditionally, for each data entity the user 190 wishes to display within the UI client runtime, the UI Backend Runtime 142 or the Service Runtime 147 would be required to grant the user 190's or application 118's right to access the particular data entity (e.g., via Authorization Device 106). For example, a user 190 may wish to see a Sales Order, which may require authorization. The user 190 may then wish to view the Products included in that Sales Order. Traditionally, this may cause a second explicit authorization or may not be viewable as the Products are part of another system (e.g., an inventory system vs. a sales system, etc.). Likewise with other items relating to the Sales Order (e.g., recipient name and address, etc.) In such an embodiment, for example, the Sales Order data entity may be controlled by a Supply Chain Management (SCM) system or service; the Item data entities may be controlled by Inventory Management or Warehouse Management systems (e.g., ERP, etc.); the Customer data entity may be controlled by a Customer relationship management (CRM), and so forth. In this example, the disclosed subject matter may be configured to allow a user 190 to access the Sales Order completely, or not at all. It is understood that the above is merely one illustrative example to which the disclosed subject matter is not limited.

In the illustrated embodiment, the UI Model 122 may be provided to the Business Service Device 104 or the UI Backend Runtime 142. In various embodiments, the UI Backend Runtime 142 may include a Shadowed UI 146. In such an embodiment, a Shadowed UI 146 may include a UI or definition of a UI that, as described below, defines a leading data entity 154 that acts as an anchor for the authorization decision (e.g., a 'completely or not at all' decision, etc.).

In one embodiment, using the relationship information provided by the UI model 122, the Shadowed UI 146 may maintain, edit, or create data model 148. In some embodiments, this data model 148 may identify one or more parent or leading data entities 154 and one or more child data entities 156. In this context, a "child data entity" includes a data entity or object that is included within, links to or is associated with, in a hierarchal fashion, a parent or leading data entity within the UI model 122. For example, returning to the Sales Order example above, the Sales Order data entity may be a leading data entity 154 as it starts or is at the top or head of the data entities. The user 190's action of viewing the Sales Order leading entity 154 may cause the other child data entities 156 to be accessed or easily available to the user 190. In this embodiment, the other data entities (e.g., Items, Customer, etc.) may be considered or defined as child data entities 156 of the Sales Order leading data entity 154.

In various embodiments, the UI Designer 194 may explicitly define where the bounds between leading data entities 154 and child data entities 156 begin and end. For example, the UI client runtime may be configured to display (e.g., via the View aspect of the MVC architecture, etc.) other data entities alongside or at the same time as the Sales Order data entity, even though these data entities may be unrelated to the Sales Order data entity. In such an embodiment, the UI designer 194 may specify in the UI Model 122 which data entities are children of the Sales Order leading entity and which are not. In one embodiment, the UI designer 194 may merely specify that the Sales Order entity is a leading data entity and the Shadowed UI 126 may determine the appropriate child data entities from any data entity links or associations included in the leading data entity. It is understood that the above are merely a few illustrative examples to which the disclosed subject matter is not limited.

In such an embodiment, in which the UI client runtime's structure is shadowed or mimicked at least in part by the Shadowed UI 146 and the data model 148, data access authorization and rights may be handled or treated differently by the system 100 than occurs in more traditional systems.

In the illustrated embodiment, the user 190 or UI client runtime may request access to a given data entity. The application 118 may transmit a data request 152 for the desired data entity. In various embodiments, the UI backend runtime 142 may interact with a service runtime 147. This service runtime 147 may include a data provider 144 configured to provide data (e.g., data entities, etc.). In some embodiments, the data provider 144 may also be configured to write-back or store within the business databases 180 any changes made in the data entities by the application 118.

In one embodiment, the user interface backend runtime 142 may determine whether or not the requested data entity is a leading data entity 154, a child data entity 156 of a prior leading data entity, or a different type of data entity (e.g., a child data entity unassociated with a prior leading data entity, etc.). For the current example, the case of a request for a new leading data entity 154 will be discussed.

In such an embodiment, the UI Backend Runtime 142 may authorize itself with the backend authorization as part of retrieving the requested data entity 154. In one embodiment, the authorization engine 170 may be incorporated with the service runtime 147. In another embodiment, the service runtime 147 may transmit a data entity request, which includes the authorization credentials or certificate (e.g., password, identifier, key, etc.), to the authorization device 106. Once authorized the authorization device 106 may instruct the service runtime 147 to provide the requested data entity to the business service device 104. As described below, while the data retrieval of the leading data entity 154 may appear similar to the traditional way the service runtime 147 may trigger the authorization check, in the described subject matter for child data entities 156 (and/or in some embodiments associated leading data entities 154) in the illustrated embodiment, the knowledge provided by the UI model 122 may be leveraged to let the UI backend runtime 142 do this job, because it knows the leading data entities 154 and the relationships to its children data entities 156.

In some embodiments, after authorizing with the authorization device 106, the UI Backend Runtime 142 may send a data access request message to the business data device 108. In yet another embodiment, upon receiving the request message, the business data device 108 may then ask the authorization device 106 if the service runtime 147 is allowed to access the request data entity. If so, the business data device 108 may then provide the requested data entity. If not, the business data device 108 may refuse to supply the requested data entity. In other embodiments, other data access and authorization protocols may be employed. It is understood that the above are merely a few illustrative examples to which the disclosed subject matter is not limited.

In various embodiments, once the service runtime 147 has acquired or accessed the data entity 158, the data entity 158 may be placed in the local data structure 150. In various embodiments, this may be a cache or temporary storage area for requested data entities 150. This data entity 158 may then be provided or transmitted to the requesting application 118. In various embodiments, various levels of processing may occur before transmitting the data entity 158 to the requesting application 118 (e.g., sorting, filtering, creating virtual fields, etc.). It is understood that the above is merely one illustrative example to which the disclosed subject matter is not limited.

In various embodiments, the UI Backend Runtime 142 may then send a message to or engage in a handshake protocol with the authorization device 106 instructing it to enter a privileged mode of operation in which the business service device 104 or the UI Backend Runtime 142 is to be treated as a trusted consumer of data entities from the business data device 108. In such an embodiment, the UI Backend Runtime 142 may be able to access additional data entities without having to further authorize itself with the authorization device 106. In some embodiments, the authorization device 106 may trust the UI Backend Runtime 142 to limit itself to accessing without further or separate authorization, child data entities associated with the leading data entity. Further, in various embodiments, while in this 'privileged mode' the authorization engine 170 may ignore any or all the traditional authorization requests arriving from the service runtime 147 for subsequent service calls until the UI runtime 142 will turn off the 'privileged mode' (e.g., because a new leading entity, such as another Sales Order instance, is read or modified, etc.).

In various embodiments, in which the authorization device 106 provides authorization services for multiple business databases 180, this privileged mode may apply to all of the business databases 180. In another embodiment, the privileged mode authorization may be limited to a subset or portion of those multiple business databases 180. It is understood that the above are merely a few illustrative examples to which the disclosed subject matter is not limited.

In one embodiment, the user 190 or application 118 may then request a second data entity. As described above, in such an embodiment, the UI backend runtime 142 may determine whether or not the second requested data entity is a leading data entity 154, a child data entity 156 of a prior leading data entity, or a different type of data entity (e.g., a child data entity unassociated with a prior leading data entity, etc.). For the current example, the case of a request for a child data entity 156 of a prior leading data entity will be discussed.

In such an embodiment, the UI Backend Runtime 142 may allow the authorization device 106 to remain in the privileged operating mode. UI Backend Runtime 142 may derive the access rights afforded to the user 190 or UI client runtime for the client data entity 156 based upon the access rights of the leading data entity 154. In one such embodiment, the UI backend runtime 142 may directly request the child data entity 156 from the business database 180 (via the service runtime 147). If the business database 180 asks the authorization device 106 if the service runtime 147 has authorization to access such a data entity, the authorization device 106, being in the privileged operating mode, may respond that as a "trusted consumer" the service runtime 147 is indeed allowed to access the requested data entity 156. The business database 180 may then transmit the requested data entity 158 to the service runtime 147. Again, in one embodiment, once this child data entity 156 has been acquired or retrieved by the service runtime 147, it may be transmitted to the application 118 and/or placed in the local data structure 150.

In various embodiments, this may occur even if the business databases 180 employed in the first and second data entity requests are separate databases but using the same authorization device 108 (e.g., the first data entity is provided by a SCM, and the second data entity is provided by a ERP, etc.). In such an embodiment, a system of authorization devices 108 may share information regarding which UI runtimes 142 are considered "trusted consumers". It is understood that the above is merely one illustrative example to which the disclosed subject matter is not limited.

In some embodiments, the UI Backend Runtime 142 may not wait for a second data request 152 to access to retrieve one or more child data entities 156. In one embodiment, the UI Backend Runtime 142 may essentially pre-fetch child data entities 156 to, for example, populate UI client runtime fields or UI elements, or preparing data in anticipation of a subsequent data request from a user 190. It is understood that the above are merely a few illustrative examples to which the disclosed subject matter is not limited.

In one embodiment, the shadow UI 146 and the data model 148 may not be fully created upon receipt of the UI Model 122. Instead, in various embodiments, the data model storage 148 may be dynamically created as a user 190 accesses different portions of the UI client runtime. For example, in one embodiment, as a user 190 causes the UI client runtime to display a screen, tab or other UI element that includes a particular leading data entity 154, the shadowed UI 146 may review the UI model 122 and create a data structure within the data model 148 based upon the leading data entity 154 (e.g., the associated child data entities 156, etc.). In another embodiment, various trigger points or events in the UI model 122 may be associated with the dynamic creation of portions of the data model 148. In yet another embodiment, the shadow UI 146 may derive the relationships between the leading and child data entities based upon the navigation path through the UI client runtime a user 190 may take to access the data entities. In such an embodiment, the navigation path may include various UI elements (e.g., labels, text fields, etc.). It is understood that the above are merely a few illustrative examples to which the disclosed subject matter is not limited.

In various embodiments, the shadowed UI 146 may aggregate or create a holistic data model 148 from all involved UI fragments that are embedded into a UI scenario as described in the UI model 122. In one embodiment, the UI backend runtime 142 may keep a data graph of all read objects (e.g., data model 148, etc.) in its buffer or memory 134 and thus can very quickly navigate from a child node or data entity 156 to its belonging parent and root node or data entity 154. In various embodiments, the UI backend runtime 142 may buffer the list of already checked objects or data entities within the current UI scenario and makes sure every item is checked only once.

In some embodiments, once the UI Backend Runtime 142 has received access rights to the leading object or data entity 154 and has derived the access rights to shadowed portions of the UI 146, the UI Backend Runtime 142 may instruct the UI client runtime to apply a visually indicator to the UI elements containing the respective data entities that show to the user 190 an indication of the level of access rights the user 190 has in regards to the data entities. For example, in one embodiment, the UI client runtime may make parts or elements of the UI read-only while it will make other parts or elements writable. In such an embodiment, the UI client runtime may no longer need to ask the UI Backend Runtime 142 if a user 190 action (e.g., editing a data entity, etc.) is acceptable after the user 190 has edited the data entity. In such an embodiment, the UI Backend Runtime 142 would have preemptively informed the UI client runtime of the level of access for each (or a subset) of the data entities. It is understood that the above is merely one illustrative example to which the disclosed subject matter is not limited.

In one embodiment, the user 190 or application 118 may then request a third data entity. As described above, in such an embodiment, the data provider may determine whether or not the third requested data entity is a leading data entity 154, a child data entity 156 of a prior leading data entity, or a different type of data entity (e.g., a child data entity unassociated with a prior leading data entity, etc.). For the current example, the case of a request for a different or second leading data entity will be discussed. In various embodiments, the following actions may be the same for any data entity request that does not involve either the prior leading data entity or a child data entity thereof.

In such an embodiment, the UI Backend Runtime 142 and/or the service runtime 147 may transmit a message to the authorization device 106 indicating that the authorization device 106 should no longer be in the privileged operating mode or that the service runtime 147 should no longer be considered a "trusted consumer". In such an embodiment, the authorization device 106 may then revert to requesting or requiring authorization for each subsequent data entity access.

In a less preferred embodiment, the UI Backend Runtime 142 may be configured to test whether or not the new leading data entity 156 is within the same security scope or includes the same access rights as the prior leading data entity. In such an embodiment, the UI Backend Runtime 142 may allow the authorization device 106 to remain in the privileged operating mode. It is understood that the above is merely one illustrative example to which the disclosed subject matter is not limited.

Returning to the case in which the authorization device 106 is removed from the privileged operating mode by the UI backend runtime 142 using a dedicated API offered by 170 to its trusted consumers. UI Backend Runtime 142 may then provide the authorization device 106 with new authorization credentials (e.g., a key, password, certificate, etc.), as described above. In some embodiments, the presentation to the authorization device 106 of the new authentication credentials may cause the authentication device 106 to exit the privileged operating mode, as opposed to an embodiment in which a separate revocation message is employed. It is understood that the above are merely a few illustrative examples to which the disclosed subject matter is not limited. In various embodiments, the accessing of the third requested data entity may occur as described above in regards to the first data entity retrieval.

Figure 2:
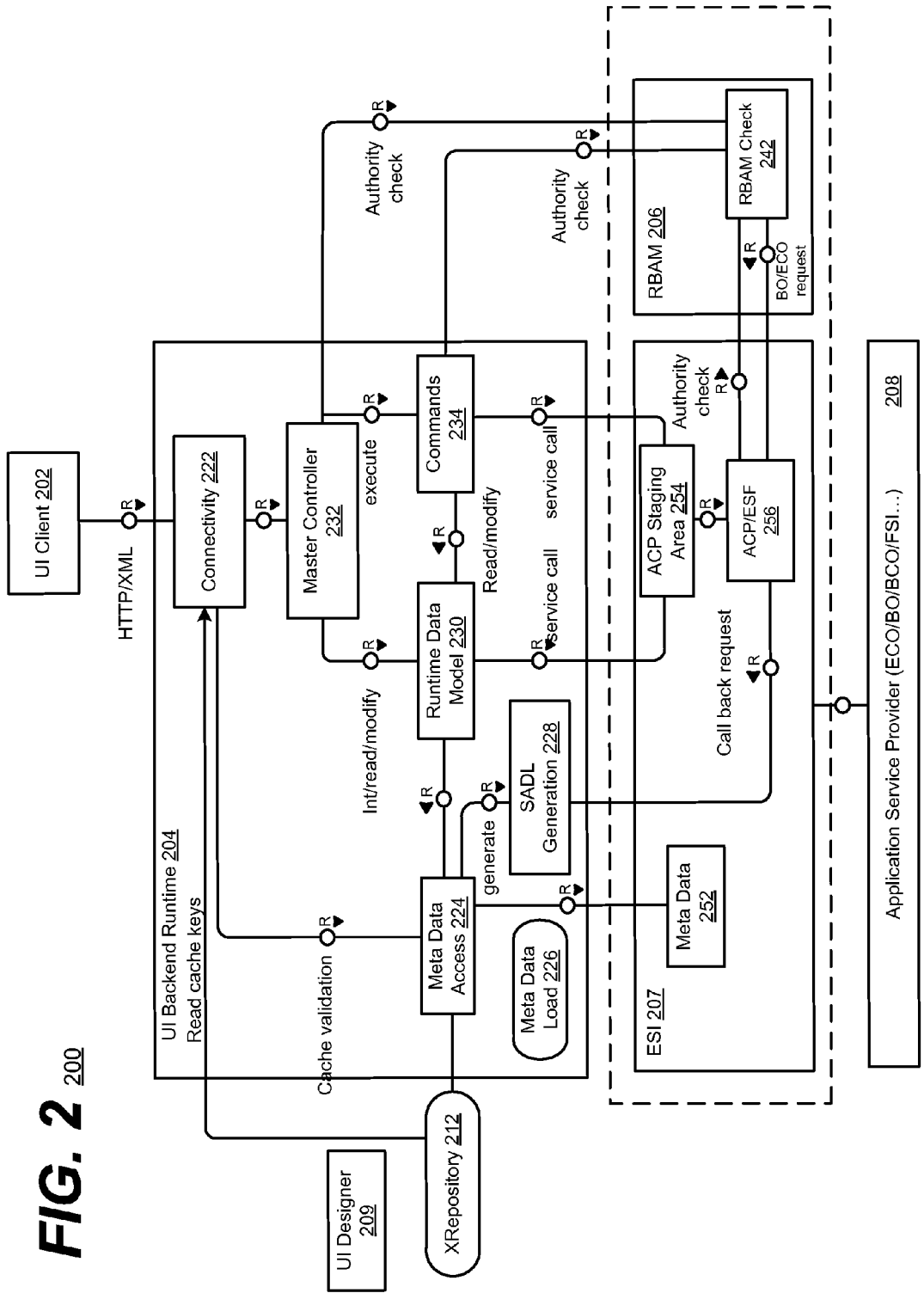
FIG. 2 is a block diagram of an example embodiment of a system in accordance with the disclosed subject matter.

FIG. 2 is a block diagram of an example embodiment of a system 200 in accordance with the disclosed subject matter. In the illustrated embodiment, a more detailed specific example of the disclosed subject matter is described. It is understood that the above is merely one illustrative example to which the disclosed subject matter is not limited.

In various embodiments, the system 200 may include a user interface (UI) client 202 that provides a UI to a user and displays the UI and data entities. In the illustrated embodiment, the UI client 202 may communicate with a UI Backend Runtime 204 that is configured to provide backend support and data management (e.g., retrieval, sorting, filtering, processing, etc.) for the UI client 202. In the illustrated embodiment, UI client 202 and the UI Backend Runtime 204 may communicate via a standardized protocol such as, for example, HTTP (Hypertext Transfer Protocol) using data exchange formats such as Hypertext Markup Language (HTML) or Extensible Markup Language (XML), etc. In such an embodiment, the UI Backend Runtime 204 may include a Connectivity module 222 configured to manage the communication between the two portions of the system 200.

In the illustrated embodiment, various UI events (e.g., mouse clicks, change in UI state, etc.) may be transmitted to the UI Backend Runtime 204 for processing. These UI client 202 requests (e.g., "load data entity #20", etc.) may be received by the master-controller 232 (via the connectivity module 222). The master-controller 232 may then attempt to fulfill this request, as described below.

The UI Backend Runtime 204 may include the runtime data model or data graph 230. This Runtime Data Model 230 may include a representation of the data entities that are bound to or associated with each UI element of the UI client 202. As described above, the Data Model 230 may be created based upon metadata provided by the UI designer 209.

In various embodiments, the UI Designer 209 may create the UI client 202 or the application running inside the UI client and store the UI model in a storage format (e.g. XML) inside a dedicated storage (e.g., XRepository 212, etc.). This UI model may be read by the UI Backend Runtime 204's Metadata Access module 224 (via the metadata load submodule 226). From this the Data Model 230 can be constructed. As described above, in various embodiments, as the user operates or access portions of the UI client 202 the Data Model 230 may be dynamically created.

In some embodiments, the UI model may be translated or converting, at least in part, into a Service Adaptation Description Language (SADL) that is configured to provide an assembly and adaptation description of the data entities used by the UI in general. In the illustrated embodiment, this may be accomplished by the SADL Generator 228.

In various embodiments, as the user causes service calls or requests for data entities to be generated, first the master-controller 232 and second the commands module 234 may process the service calls. In various embodiments, the master controller 232 may compile the incoming request into commands, to be executed by the commands module 234 in a way that it follows a phase model. In such an embodiment, this phase model may guaranty transactional consistency (e.g. data first must be saved before actions can be executed on them). In some embodiments, whether the master-controller 232 or the commands module 234 processes the service call may depend upon what the service call is or how the service call was generated (e.g., via a particular UI event, etc.). It is understood that the above is merely one illustrative example to which the disclosed subject matter is not limited.

In various embodiments, the system 200 may include a service layer 209 configured to provide data entities to the UI backend Runtime 204. In the illustrated embodiment, the service layer 209 may include an Enterprise Service Interface (ESI) or data structure 207 and a Role-Based Access Manager (RBAM) or authentication device 206. In one embodiment, the ESI 207 may be an embodiment of the data structure 150 of FIG. 1. The ESI 207 may be configured to retrieve data entities from one or more Application Service Providers (ASPs) 208. In various embodiments, the Application Service Providers 208 may be embodiments of the business databases 180 of FIG. 1. In one embodiment, the RBAM 206 may be an embodiment of the authentication device 106 of FIG. 1. The RBAM 206 may be configured to manage the access rights of the UI Backend Runtime (or other components) to the data entities provided by the ESI 207. It is understood that the illustrated is merely one specific example to which the disclosed subject matter is not limited.

In the illustrated embodiment, the ESI 207 may include a metadata module 252 that, in one embodiment, may include metadata (e.g., a data type dictionary, a data provider dictionary, etc.) associated with the data entities stored in or used by the ESI 207. In various embodiments, the ESI 207 may include an Application Client Proxy (ACP), 256 and a modification, intermediate, or transactional buffer 254 configured to store or cache data entities from the ASPs 208. In various embodiments, the data structure comprising the data entities may be modifiable (e.g., by via edits from the UI Client 202, etc.). In some embodiments, the ESI 207 may include an ACP 256 configured to provide data entities to the UI Backend Runtime 204. In various embodiments, the ESI 207 may support a plurality of UI Backend Runtimes 204 of other services (not shown).

In the illustrated embodiment, the RBAM or authentication device 206 may be configured to perform an authorization or access rights check for each service call or data entity access attempted by the UI Backend Runtime 204. In various embodiments, the RBAM 206 may include a RBAM Check module 242 to perform this authorization check. In the illustrated embodiment, the RBAM 206 may not be configured to be aware of the UI Client 202 structure or the relationship between data entities (e.g., leading data entities, child data entities, etc.).

Returning to the illustrative example in which a leading data entity is requested or queried by the UI Client, in this case UI client 202. Upon receipt of the service call, the master-controller 232 (together with the Commands module 234, or one of both, depending upon the implementation) may determine (via the runtime data model 230) whether or not the requested data entity is a leading data entity or otherwise requires authentication. If so, in the illustrated embodiment, master-controller 232 request that the RBAM 206 perform an authority or authorization check for the next service call, and then the master-controller 232 causes the service call to be forwarded or made to the ESI layer 207. In the illustrated embodiment, the ESI 207 may run into situations where it needs to ask the RBAM 206 explicitly if the UI Backend Runtime 204 is authorized to perform certain service calls which the master-controller 232 does not have direct access to (e.g., multiphase commit commands along with the save service, such as "check-before-save", etc.). The RBAM 206 may approve or deny the service call and the ESI 207 may fulfill it or not accordingly. It is understood that the above are merely a few illustrative examples to which the disclosed subject matter is not limited.

In the illustrated embodiment, when a subsequent service call is processed by the master-controller 232 for a child data entity, the master-controller 232 may ask the RBAM 206 to not perform an authority or authorization check for the next service-call. The service call for the child data entity may be made to the ESI 207. When the ESI 207 makes the authority check to the RBAM 206, the RBAM 206 may simply approve the service call without performing an actual validation of the authorization credentials included in the service call. In such an embodiment, the RBAM 206 may be placed in a privileged operating mode in which the UI Backend Runtime 204 is considered a trusted consumer of the service layer 209.

In one embodiment, the master-controller 232 may provide a "don't check" authorization message for each service call that is not to be checked. In another embodiment, the master-controller 232 may provide a "stop checking" authorization message to the RBAM 206 when the RBAM 206 is to enter the privileged operating mode and then issue a "start checking" authorization message when the RBAM 206 is to exit the privileged operating mode. In yet another preferred embodiment, service-calls may include requests concerning multiple data entities (e.g., read 10 data entities, etc.). In such an embodiment, the master controller 232 may group data-entities to minimize or reduce the number of authority check messages sent to the RBAM 206. It is understood that the above are merely a few illustrative examples to which the disclosed subject matter is not limited.

In various embodiments, the ESI 208 and the RBAM 206 may be integrated into a single device or machine. In some embodiments, the service layer 209 may be or may be included by a separate device or machine from the UI Backend Runtime 204. It is understood that the above are merely a few illustrative examples to which the disclosed subject matter is not limited.

Figure 3:
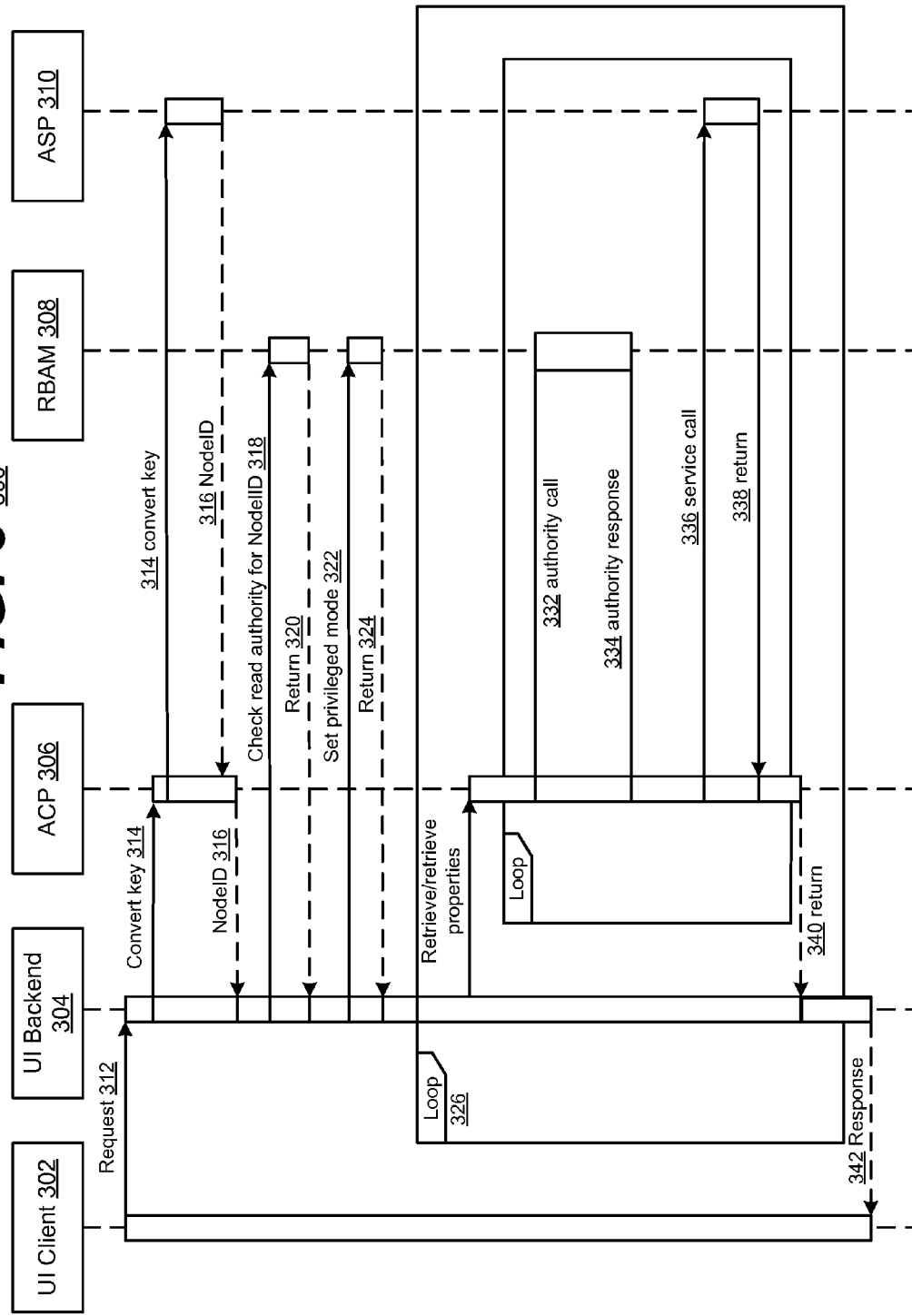
FIG. 3 is a timing diagram of an example embodiment of a system in accordance with the disclosed subject matter.

FIG. 3 is a timing diagram of an example embodiment of a system 300 in accordance with the disclosed subject matter. In various embodiments, the system 300 may include a UI client 302, a UI backend 304, an ACP or transactional buffer 306, an RBAM or authentication engine 308, and an ASP or business database 310.

Action 312 illustrates that the UI client 302 may request a plurality of data entities (e.g., a Sales Order data entities and any child data entities associated with the Sales Order, etc.). Actions 314 and 316 illustrates that in one embodiment, the UI Backend 304 and ACP 306 may convert the leading data entity's nomenclature from the UI client 302 to a key or nomenclature understood by the ASP 310.

Actions 318 and 320 illustrates that, in one embodiment, the UI Backend 304 and the RBAM 308 may perform an authentication or authority check to determine the access rights the user or UI Client 302 is entitled to for the leading data entity. Actions 322 and 324 illustrates that, in one embodiment, the UI Backend 304 may place the RBAM 308 in a privileged operating mode in which the UI Backend 304 is considered a trusted consumer of the service layer (e.g., ACP 306 and RBAM 308, etc.).

Block 326 illustrates that, in one embodiment, the UI Backend 304 may perform the same actions for a number of service calls or data entities included in the request action 312. Action 328 illustrates that, in one embodiment, the UI Backend may request that the ACP 306 provide a certain data entity and any metadata or properties associated with data entity.

Block 330 illustrates that, in one embodiment, the ACP 306 may likewise perform the same actions for a number of service calls or data entities included in the request action 312. Actions 332 and 334 illustrates that, in one embodiment, the ACP 306 may check with the RBAM 308 that the UI Backend as the proper authority to access (e.g., read or write, etc.) the requested data entity. As described above, In various embodiments, when the RBAM 308 is operating in the privileged operating mode (see Actions 322 and 324), the RBAM 308 may simply automatically approve any such authority check without actually performing the authority check. Actions 336 and 338 illustrates that, in one embodiment, the ACP 306 may retrieve or access the requested data entity from the respective ASP 310.

Action 342 illustrates that, in one embodiment, once the requested data entities have been retrieved or accessed (e.g., in the case of a write operation, etc.) they may be transferred to the UI client 302 for display or other processing. In various embodiments, the UI Backend 304 may remove the RBAM for the privileged operating mode such that further or subsequent data accesses require proper or actual authentication. It is understood that the above is merely one illustrative example to which the disclosed subject matter is not limited.

FIG. 4 is a screenshot of an example embodiment of a user interface 400 in accordance with the disclosed subject matter. UI 400 illustrates that, in one embodiment, the UI backend may instruct or alter the behavior of the UI client based upon the access rights provided or associated with one or more data entities.

In the illustrated embodiment, a screen or other UI container or element (e.g., tab, dialog box, etc.) may display a data entity (e.g., a Sales Order data object, etc.). UI element 402 may indicate to the user which data entity is being displayed (e.g., Sales Order 1046, etc.). In such an embodiment, the UI backend may have retrieved various child data entities (e.g., Account Name, Items, etc.) associated with the leading data entity (e.g., Sales Order 1046, etc.). In doing so, the UI Backend may determine the access rights of the child data entities.

In various embodiments, the UI Backend may inform the UI client to alter the way the child data entities are displayed based upon their respective associated access rights. For example, in the illustrated embodiment, the UI client may be informed that the Account Name data entity is editable by the user. In the illustrated embodiment, the UI client may then choose to display the information of the data entity via an editable text field or UI element 404.

Conversely, in the illustrated embodiment, the user may not have the access rights to edit the data entity including the status of the Sales Order 1046. In such an embodiment, the UI client may then choose to display the information of the data entity via an unchangeable label, text field, or UI element 406.

It is understood that the above are merely a few illustrative examples to which the disclosed subject matter is not limited. In other embodiments, the UI client may, based upon the access rights associated with the various data entities, alter the way in which the information included by the data entities is displayed or provided via the UI. For example, the UI may disable a UI element, make the UI element editable, change the color of the UI element, add an icon or other visual indicator to the UI such that a user may identify or understand the access rights associated with the data entity, etc. It is understood that the above are merely a few illustrative examples to which the disclosed subject matter is not limited.

FIG. 5 is a flowchart of an example embodiment of a technique in accordance with the disclosed subject matter. In various embodiments, the technique 500 may be used or produced by the systems such as those of FIG. 1, 2, or 3. Furthermore, portions of technique 500 may be used or produced by the systems such as that of FIG. 4. Although, it is understood that the above are merely a few illustrative examples to which the disclosed subject matter is not limited. It is understood that the disclosed subject matter is not limited to the ordering of or number of actions illustrated by technique 500.

Block 502 illustrates that, in one embodiment, a data model of data entries employed by a user interface may be maintained, as described above. In various embodiments, maintaining may include dynamically creating the data model as a user accesses different portions different portions of the user interface, as described above. In another embodiment, maintaining may include deriving the relationship between two data entities based upon, at least in part, a navigation path through the user interface a user may take to access the data entities, as described above. In such an embodiment, the navigation path may include a plurality of user interface elements of the user interface, as described above. In yet another embodiment, the data model may include a hierarchal relationship between a leading data entity and at least one child data entity, as described above. In various embodiments, one or more of the action(s) illustrated by this Block may be performed by the apparatus or systems of FIG. 1, 2 or 3, the business service device 104, shadowed UI 146 of FIG. 1, UI Backend of FIGS. 2 and/or 3, as described above.

Block 504 illustrates that, in one embodiment, an authentication may occur when retrieving the leading data entity, as described above. In various embodiments, one or more of the action(s) illustrated by this Block may be performed by the apparatus or systems of FIG. 1, 2 or 3, the business service device 104, authentication engine 170 of FIG. 1, RBAM of FIGS. 2 and/or 3, as described above.

Block 506 illustrates that, in one embodiment, the authentication device may be instructed that data retrievals of subsequent data entities are to be authorized based upon the authentication of the leading data entity, as described above. In various embodiments, instructing may include placing the authentication device in a privileged operating mode, as described above. In some embodiments, instructing may include making the user interface backend a trusted consumer of the authentication device, as described above. In various embodiments, one or more of the action(s) illustrated by this Block may be performed by the apparatus or systems of FIG. 1, 2 or 3, the business service device 104, authentication engine 170 of FIG. 1, RBAM of FIGS. 2 and/or 3, as described above.

Block 508 illustrates that, in one embodiment, at least one child data entry of the leading data entity may be retrieved without providing additional authentication credentials, as described above. In various embodiments, one or more of the action(s) illustrated by this Block may be performed by the apparatus or systems of FIG. 1, 2 or 3, the business service device 104, service runtime 147 of FIG. 1, ESI of FIGS. 2 and/or 3, as described above.

Block 520 illustrates that, in one embodiment, a request from the user interface to access a second leading data entity may be received, as described above. Block 522 illustrates that, in one embodiment, the authentication device may be instructed to request authentication for each subsequent data entry access, as described above. Block 524 illustrates that, in one embodiment, the second leading data entity may be accessed by providing an authentication credential for the second leading data entity, as described above. In various embodiments, one or more of the action(s) illustrated by this Block may be performed by the apparatus or systems of FIG. 1, 2 or 3, the business service device 104, authentication engine 170 of FIG. 1, RBAM of FIGS. 2 and/or 3, as described above.

Block 540 illustrates that, in one embodiment, based upon a user's access rights with respect to the leading data entity, the user's access rights with respect to the child data entities of the leading data entity may be derived, as described above. Block 542 illustrates that, in one embodiment, the user interface may be altered based upon the user's access rights with respect to the child data entities, as described above. In various embodiments, one or more of the action(s) illustrated by this Block may be performed by the apparatus or systems of FIG. 1, 2 or 3, the business service device 104, UI client runtime 120 of FIG. 1, UI Backend of FIGS. 2 and/or 3, as described above.

FIG. 6 is a flowchart of an example embodiment of a technique in accordance with the disclosed subject matter. In various embodiments, the technique 600 may be used or produced by the systems such as those of FIG. 1, 2, or 3. Furthermore, portions of technique 600 may be used or produced by the systems such as that of FIG. 4. Although, it is understood that the above are merely a few illustrative examples to which the disclosed subject matter is not limited. It is understood that the disclosed subject matter is not limited to the ordering of or number of actions illustrated by technique 600.

Block 602 illustrates that, in one embodiment, a user interface backend's right to access a leading data entity may be authorized, as described above. In various embodiments, the user interface backend may be configured to maintain a data model that includes a hierarchical relationship between a leading data entity and at least one child data entity, as described above. In such an embodiment, the data model may be dynamically created as a user accesses different portions of a user interface associated with the user interface backend, as described above. In various embodiments, one or more of the action(s) illustrated by this Block may be performed by the apparatus or systems of FIG. 1, 2 or 3, the business service device 104 of FIG. 1, UI Backend of FIGS. 2 and/or 3, as described above.

Block 604 illustrates that, in one embodiment, the leading data entity may be provided to the user interface backend, as described above. In various embodiments, one or more of the action(s) illustrated by this Block may be performed by the apparatus or systems of FIG. 1, 2 or 3, the business service device 104 or service runtime 147 of FIG. 1, UI Backend of FIGS. 2 and/or 3, as described above.

Block 606 illustrates that, in one embodiment, an instruction may be received to authorize further data entity retrievals b the user interface runtime based upon the authorization of the leading data entity access, as described above. In various embodiments, receiving an instruction may include placing the authorization in a privileged operating mode, as described above. In various embodiments, one or more of the action(s) illustrated by this Block may be performed by the apparatus or systems of FIG. 1, 2 or 3, the business service device 104, authorization engine 170 of FIG. 1, RBAM of FIGS. 2 and/or 3, as described above.

Block 608 illustrates that, in one embodiment, a subsequent data entity request may be fulfilled by using the authorization of the leading data access, as described above. In various embodiments, the subsequent data entity request may be for a child data entity of the leading data entity, as described above. In various embodiments, one or more of the action(s) illustrated by this Block may be performed by the apparatus or systems of FIG. 1, 2 or 3, the business service device 104, authorization engine 170 of FIG. 1, RBAM of FIGS. 2 and/or 3, as described above.

Block 610 illustrates that, in one embodiment, a second instruction may be received to cease authorizing data entity retrievals by the user interface backend based upon the authorization of the leading data entity access, as described above. In various embodiments, one or more of the action(s) illustrated by this Block may be performed by the apparatus or systems of FIG. 1, 2 or 3, the business service device 104, authorization engine 170 of FIG. 1, RBAM of FIGS. 2 and/or 3, as described above.

Block 612 illustrates that, in one embodiment, separate authorization for each subsequent data entity access may be required from the user interface backend, as described above. In various embodiments, one or more of the action(s) illustrated by this Block may be performed by the apparatus or systems of FIG. 1, 2 or 3, the business service device 104, authorization engine 170 of FIG. 1, RBAM of FIGS. 2 and/or 3, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
    maintaining a data model of data entities from a backend data device employed by a user interface, the data entities including a first leading data entity and at least one child data entity associated with the first leading data entity, the data model including a hierarchical relationship between the first leading data entity and the at least one child data entity;
    receiving a request for a data entry;
    determining whether the requested data entry is the first leading data entity or a child data entity;
    authorizing, with an authorization device, retrieval of the first leading data entity when the requested data entry is determined as the first leading data entity;
    instructing the authorization device that subsequent retrieval of the data entities associated with the first leading data entity are to be authorized based on the authorization of the first leading data entity, wherein the authorization device enters a privileged operation mode; and
    retrieving the at least one child data entity associated with the first leading data entity without further authorization while the authorization device is in the privileged operation mode.

2. The method of claim 1, wherein maintaining a data model includes dynamically creating the data model as a user accesses different portions of the user interface.

3. The method of claim 1, further comprising:
    receiving a request from the user interface to access a second leading data entity;
    deactivating the privileged operation mode by instructing the authorization device to request authorization for each subsequent data entity access; and
    accessing the second leading data entity by providing an authorization credential for the second leading data entity.

4. The method of claim 1, further comprising:
    deriving, based at least on a user's access rights with respect to the first leading data entity, the user's access rights with respect to the child data entities associated with the first leading data entity.

5. The method of claim 4, further comprising:
    altering the user interface based upon the user's access rights with respect to child data entities.

6. The method of claim 1, wherein the privileged operation mode makes the user interface backend a trusted consumer of the authorization device.

7. The method of claim 1, wherein maintaining a data model includes deriving the relationship between two data entities based upon, at least in part, a navigation path through the user interface a user may take to access the data entities.

8. The method of claim 7, wherein the navigation path includes a plurality of user interface elements of the user interface.

9. An apparatus comprising:
a processor configured to maintain a data model of data entities from a backend data device employed by a user interface, the data entities including a leading data entity and at least one child data entity associated with the leading data entity, the data model including a hierarchical relationship between the first leading data entity and the at least one child data entity; and
a network interface configured to:
receive a request for a data entry;
determine whether the requested data entry is the first leading data entity or a child data entity;
authorize, with an authorization device, retrieval of the first leading data entity when the requested data entry is determined as the first leading data entity,
instruct the authorization device that subsequent retrieval of the data entities associated with the leading data entity are to be authorized based on the authorization of the first leading data entity, wherein the authorization device enters a privileged operation mode, and
retrieve the at least one child data entity associated with the first leading data entity without further authorization while the authorization device is in the privileged operation mode.

10. The apparatus of claim 9, wherein the processor is configured to dynamically create the data model as a user accesses different portions of the user interface.

11. The apparatus of claim 9, wherein the network interface is configured to:
receive a request from the user interface to access a second leading data entity;
deactivate the privileged operation mode by instructing the authorization device to request authorization for each subsequent data entity access; and
access the second leading data entity by providing an authorization credential for the second leading data entity.

12. The apparatus of claim 9, wherein the privileged operation mode makes the apparatus a trusted consumer of the authorization device.

13. A method comprising:
receiving a request for a data entry;
determining whether the requested data entry is a first leading data entity or a child data entity;
authorizing, by an authorization device, a user interface backend's right to access and retrieve the leading data entity when the requested data entry is determined as the first leading data entity;
retrieving and providing the leading data entity to the user interface backend;
receiving an instruction, from the user interface backend, to authorize subsequent retrieval of data entities associated with the leading data entity by the user interface runtime based on the authorization of the leading data entity access, wherein the authorization devices enters a privileged operation mode; and
fulfilling requests for retrieval of the subsequent data entities, from the user interface backend, using the authorization of the leading data access such that further authorization is not needed while the authorization device is in the privileged operation mode.

14. The method of claim 13, wherein the user interface backend maintains a data model that includes a hierarchical relationship between the leading data entity and the data entities including the child data entity.

15. The method of claim 14, wherein the data model is dynamically created as a user accesses different portions of a user interface associated with the user interface backend.

16. The method of claim 13, wherein the requests for retrieval of the subsequent data entities include requests for child data entities associated with the leading data entity.

17. The method of claim 13, further comprising:
receiving a second instruction, from the user interface backend, to cease authorizing data entity retrievals by the user interface backend based upon the authorization of the leading data entity access; and
requiring separate authorization for each subsequent data entity access from the user interface backend.

* * * * *